3,700,606
ELECTROCONDUCTIVE GLAZE AND METHOD
FOR PREPARATION
Charles F. Parks, Grand Island, N.Y., assignor to Air
Reduction Company, Incorporated, New York, N.Y.
No Drawing. Continuation of application Ser. No.
704,268, Feb. 9, 1968. This application Sept. 30,
1970, Ser. No. 76,971
Int. Cl. H01b 1/06
U.S. Cl. 252—518                                  1 Claim

ABSTRACT OF THE DISCLOSURE

An alumina compatible electroconductive glaze composition comprising finely divided particles of thallium oxide dispersed in an at least partially devitrified solder glass martix.

---

This is a continuation of application Ser. No. 704,268, filed Feb. 9, 1968, now abandoned.

BACKGROUND OF THE INVENTION

This invention relates generally to electrical resistor manufacture and, more specifically, to compositions of the type suitable for formation into electroconductive glazes. The invention may be regarded as an improvement upon the resistor compositions disclosed in U.S. Pat. 3,238,151 to K. H. Kim, which patent is assigned to the same assignee as is the present invention.

The aforementioned Kim patent is one of a series of recent disclosures directed toward a new class of materials frequently referred to as electroconductive glazes. These ceramic-like materials typically comprise dispersions of metals, conductive oxides, semiconductors, etc. in glass frit matrices including miscellaneous added inert materials and/or temporary binders. In addition to the Kim teaching alluded-to, essentially resistive compositions of this type are disclosed, for example, in U.S. Pats. 3,052,573, 3,154,503, and 3,329,526. All of the foregoing compositions are characterized by the fact that firing thereof yields a thoroughly uniform glazed product which externally resembles glass or a ceramic.

The Kim teaching referred to has been particularly noteworthy in the art of electroconductive glaze technology in that the product disclosed therein not only displays excellent electrical properties with regard to voltage coefficient of resistance, temperature coefficient of resistance, noise levels, and temperature and moisture stability, but moreover is very advantageous from a cost viewpoint in that the thallium oxide conductive dispersant utilized is an inexpensive material when compared to the noble metal oxides and similar materials which have been used in most of the other successful electroconductive glazes.

In one very important respect, however, the thallium oxide glaze materials of Kim have proved less than satisfactory. In particular, it has been found that these glaze materials are relatively unstable in those instances where the thallium oxide pastes are coated and fired upon alumina substrates. It is not precisely clear why the stability of such thallium oxide glazes should be detrimentally affected in the alumina environment; however, it is suspected that the cause may be micro-cracks which for some reason or another develop where alumina is so coated. Regardless of the explanation for the observed performance, the fact remains that alumina has become the most widely utilized material for the substrates of microcircuitry applications and accordingly the necessity for utilizing a glaze compatible therewith is overwhelming.

In accordance with the aforegoing, it may be regarded as an object of the present invention to provide an electroconductive glaze compatible with alumina substrates in which the principal conductive component is dispersed thallium oxide.

It is a further object of the present invention to provide a method which enables successful use of thallium oxide electroconductive glazes in microcircuitry applications requiring application of these glazes to alumina.

SUMMARY OF THE INVENTION

Now in accordance with the present invention, it has been found that the objects previously set forth can be achieved by utilizing with the dispersed thallium oxide a solder glass material of the type which exhibits devitrification characteristics at or below the firing temperatures utilized for rendering the paste materials into the glaze form. While there is no intention to be bound by any specific theory as to why the stated composition should be successful in the alumina environment, it may be suggested that the devitrification present where a glass of the type cited is utilized as indicated, produces superior mechanical properties in the glaze material and may act to adjust the coefficient of expansion of the materials so as to render the resulting glazes more compatible with alumina. It is also suspected that the resulting materials may simply be mechanically and/or chemically more durable and hence more resistant to the formation of subsequent imperfections in the glaze products.

DESCRIPTION OF THE PREFERRED EMBODIMENT

In accordance with the present invention, particles of thallium oxide are interdispersed in a very fine form in a glass martix of the type of material referred to as a devitrifying solder glass. The term "solder glass" per se generally refers to a low melting glass composition used for joining materials, and particularly for sealing glass to metals. These glasses are more particularly described in terms of functional characteristics, it usually being indicated that the glasses are characterized by a viscosity of $10^4$ to $10^6$ poises viscosity at the sealing temperatures. In general, two types of solder glass are recognized—the thermoplastic or stable type, and the thermosetting or devitrifying type. It is the latter type of materials, the devitrifying variety of solder glass, that is utilized in accordance with the present invention. Typically, these thermosetting or devitrifying glazes are formed from the system $PbO-B_2O_3-ZnO-SiO_2$, often $Al_2O_3$ or CuO additions, or both. Depending upon the specific composition of a given vitrifying solder glass, devitrification, that is to say, conversion to crystalline form, begins to occur at given temperatures. As is well-known in the art, a given devitrifying composition may be modified by inclusion of suitable ingredients so that the temperature of devitrification can be suitably adjusted. Zinc oxide content, particularly in view of the particular amount of lead oxide present, is usually regarded as the key agent in controlling this aspect of devitrification.

The present invention is illustrated by way of examples in the following paragraphs:

EXAMPLE I

A resistive paste composition was prepared from the following ingredients:

| | | |
|---|---|---|
| $Tl_2O_3$ | g | 10 |
| #2899 (Harshaw Chemical Co.) glass | g | 10 |
| Ethyl Cellulose solution (150 cps.) | g | 2 |
| Butyl Carbitol | cc | 3.0 |

The oxide and glass are typically powdered to a fine size, preferably lass than 10 microns. The #2899 Harshaw glass referred to shows an approximate analysis of 76% PbO, 8% $B_2O_3$, 2% $SiO_2$, 4% BaO, and 10% ZnO, and is known to display devitrifying properties below the temperature utilized in this example. The ingredients were mixed for one hour on a mortar and pestle and then passed through a roll mill 30 times. Stripes of the mix were then screen printed onto predetermined alumina substrates, dried for 10 minutes at 110° C., and then fired at 550° C. for a average period of 13 minutes. Properties of a typical sample fired as indicated are shown below:

Resistance _____ 266.6 ohms/square.
Noise _____ −15.2 db/dec.
Temperature coefficient of resistance _____ −16 p.p.m./° C.
Moisture change (24 hr. at 65° C.) _ −0.1 percent.

EXAMPLE II

A series of pastes with various ratios of thallium oxide to #2899 glass were prepared in a manner similar to that of Example I. Approximate average properties of high and low value mixes fired at 550° C. for a period of 32 minutes are shown below:

| Resistance, K ohms/sq. | Percent change on— | | |
|---|---|---|---|
| | 150° stability 93 hours | 65° humidity 93 hours | Thermal cycling |
| 12.8 | +0.96 | −1.2 | +4.69 |
| 0.33 | +1.91 | −0.6 | +2.46 |

The thermocycling test referred to is a standard test in the art and it is performed by running five complete cycles on the resistor in question starting at −65° C. and running to 150° C., each cycle taking a total time of 30 minutes, with 10 to 15 minutes being allowed between successive cycles. Read-out in this type of test is performed in three hours or upon stabilization.

For comparison with the results set forth, thallium oxide and the Q12 glass of the prior art (a standard borosilicate glass available from Harshaw Chemical Company under the designation indicated, which does not display devitrifying properties) was prepared and fired into stripes of similar resistance at 550° C. with resulting properties as shown below:

| Resistance, K ohms/sq. | Percent change on— | | |
|---|---|---|---|
| | 150° stability 93 hours | 65° humidity 93 hours | Thermal cycling |
| 16.9 | +50.0 | +1.5 | +26.3 |
| 0.25 | +46.0 | +10.0 | +79.2 |

Thus it is clear that the resistors prepared in accordance with the present invention show great improvement in stability characteristics as compared with those of the prior art.

EXAMPLE III

Other devitrifying solder glasses were prepared into pastes in a manner resembling the scheme described in connection with Example I, printed into resistors and fired at various temperatures. Properties obtained on these are shown for Ferro glasses DP–687–A and DP–687–B. The glasses alluded-to are products available under the designations indicated from the Ferro Corporation of Cleveland, Ohio, and are known to exhibit devitrifying properties even at 450° C.

| Glass No. | Firing temp., ° C. | Resist., K ohms/sq. | Percent change | | | Noise, db/dec. | TC to 150°, p.p.m./° C. |
|---|---|---|---|---|---|---|---|
| | | | Anneal change | Therm. cycl. | 150° thermal stab. | | |
| 687A | 575 | 296.9 | +0.10 | +2.4 | −0.19 | −11.7 | −24 |
| 687B | 550 | 143.4 | −0.73 | +6.4 | +1.3 | −12.8 | +19 |

EXAMPLE IV

The actual degree of devitrification achieved in accordance with the present invention is a factor in determining the thermal stability properties of the thallium oxide resistors prepared with the devitrifying solder glasses. The present example is indicative of this factor.

In this instance, a paste was prepared containing 29 g. of $Tl_2O_3$, 71 g. of #2899 glass, 10 g. of ethyl cellulose and 10 ml. of butyl Carbitol using seven passes through a roll mill. A paste was also prepared using no thallium oxide (which is black) for visual observation of the effect of firing under various conditions on the state of the #2899 glass binder. Resistive stripes were screen printed on preterminated alumina substrates from the thallium oxide containing paste, while large square patterns were screen printed on alumina substrates for visual observation. Samples of each were fired for various times at a temperature of 550° C., with the results indicated in the table below.

| Time, minutes | #2899 only paste | | $Tl_2O_3$ containing paste | |
|---|---|---|---|---|
| | Color | Appearance | Therm. stab. | 150° C. stab. (484 hrs.) |
| 9 | Black | Glassy | a+1.72 | a+0.56 |
| 18 | Gray | Partially crystallized | +0.38 | +1.05 |
| 45 | Tan | Crystallized | +0.10 | +1.37 | a Percent change in resistance.

Other #2899 paste samples which had the black glassy and tan crystallized appearance were found by X-ray analysis to be amorphous and recrystallized respectively, indicating that the devitrification was occurring as expected with this type of solder glass. Measurement of percent change in resistance indicated that under conditions of firing which lead to devitrification the thermal cycling stability is considerably improved. At the same time long term thermal stability may in some cases be better with less devitrification, either by means of a certain firing schedule or as described in the next example.

EXAMPLE V

In some instances, long-term thermal stability (by which is meant stability over a sustained period such as the 484 hour period indicated in connection with Example IV) may be improved by incorporating simultaneously a devitrifying glass and a non-devitrifying glass into the glaze composition. In the present example, simple pastes were thus prepared containing 30% $Tl_2O_3$ and the amounts of Harshaw #2899 and #6084 (a glass not exhibiting devitrifying properties) shown below. Resistors fired at 575° C. for 45 minutes showed the following properties:

| Percent | | Thermal cycling | Percent change, 150° C. stability (427 hrs.) |
|---|---|---|---|
| Number 2899 | Number 6084 | | |
| 70 | 0 | −0.13 | +2.63 |
| 65 | 5 | −0.12 | +0.05 |

While the invention has been particularly illustrated in terms of specific embodiments thereof, it will be understood in view of the present disclosure that numerous modifications may be made in the invention without departing from the scope of the present teaching. For example, although the glaze materials of the invention have been particularly described in connection with their applicability to alumina materials, the same glaze materials are effective when applied to many other materials such as, for example, forsterite, steatite, and titanate. Accordingly, the invention is to be broadly construed and limited only by the scope and spirit of the claim hereto.

I claim:
1. An electrically conductive article of manufacture comprising in combination a resistive thallium oxide containing glaze coating integrally bonded to an alumina substrate wherein said glaze coating comprises a devitrifiable solder glass formed from the system $PbO$-$B_2O_3$-$ZnO$-$SiO_2$ containing finely divided particles of thallium oxide dispersed therein which has been fired at temperatures sufficient to at least partially devitrify said solder glass.

References Cited
UNITED STATES PATENTS

| | | | |
|---|---|---|---|
| 3,551,355 | 12/1970 | Provance | 252—518 |
| 3,238,151 | 3/1966 | Kim | 252—518 |

DOUGLAS J. DRUMMOND, Primary Examiner

U.S. Cl. X.R.

106—53